(12) United States Patent  
Richardson et al.

(10) Patent No.: US 7,657,513 B2
(45) Date of Patent: Feb. 2, 2010

(54) ADAPTIVE HELP SYSTEM AND USER INTERFACE

(75) Inventors: Cyra Richardson, Bellevue, WA (US); Kynan Antos, Seattle, WA (US)

(73) Assignee: Microsoft Corporation, Redmond, MA (US)

( * ) Notice: Subject to any disclaimer, the term of this patent is extended or adjusted under 35 U.S.C. 154(b) by 203 days.

(21) Appl. No.: 11/607,728

(22) Filed: Dec. 1, 2006

(65) Prior Publication Data

US 2008/0133449 A1 Jun. 5, 2008

(51) Int. Cl.
*G06F 17/30* (2006.01)
(52) U.S. Cl. .............................. 707/3; 707/101; 707/102
(58) Field of Classification Search .................. 707/3, 707/101, 102
See application file for complete search history.

(56) References Cited

U.S. PATENT DOCUMENTS

| | | | |
|---|---|---|---|
| 5,255,386 A | 10/1993 | Prager | |
| 5,694,559 A | 12/1997 | Hobson et al. | |
| 6,185,576 B1 | 2/2001 | McIntosh | |
| 6,523,026 B1 * | 2/2003 | Gillis | 707/3 |
| 6,678,677 B2 * | 1/2004 | Roux et al. | 707/3 |
| 6,728,700 B2 | 4/2004 | Richards et al. | |
| 6,983,271 B2 | 1/2006 | Morrow et al. | |
| 7,024,658 B1 | 4/2006 | Cohen et al. | |
| 7,039,635 B1 | 5/2006 | Morgan et al. | |
| 7,062,711 B2 | 6/2006 | Kethireddy | |
| 7,120,574 B2 * | 10/2006 | Troyanova et al. | 704/9 |
| 2003/0033292 A1 * | 2/2003 | Meisel et al. | 707/3 |
| 2003/0217052 A1 * | 11/2003 | Rubenczyk et al. | 707/3 |
| 2004/0093331 A1 * | 5/2004 | Garner et al. | 707/3 |
| 2004/0230572 A1 * | 11/2004 | Omoigui | 707/3 |
| 2005/0114324 A1 * | 5/2005 | Mayer | 707/3 |
| 2005/0154719 A1 | 7/2005 | Choudhary et al. | |
| 2005/0234881 A1 * | 10/2005 | Burago et al. | 707/3 |
| 2006/0047632 A1 * | 3/2006 | Zhang | 707/3 |
| 2006/0074987 A1 * | 4/2006 | Bitsch | 707/104.1 |
| 2006/0116986 A1 * | 6/2006 | Radcliffe | 707/3 |
| 2006/0167857 A1 * | 7/2006 | Kraft et al. | 707/3 |
| 2008/0071742 A1 * | 3/2008 | Yang et al. | 707/3 |
| 2008/0091670 A1 * | 4/2008 | Ismalon | 707/5 |
| 2008/0104040 A1 * | 5/2008 | Ramakrishna | 707/3 |

FOREIGN PATENT DOCUMENTS

WO  WO2005048537 A1  5/2005

OTHER PUBLICATIONS

Goodall Susan D., "Online Help in the Real World", Date: 1991, pp. 21-29, ACM Press, NY, USA, http://delivery.acm.org/10.1145/130000/122783/p21-goodall.pdf?key1=122783&key2=6532491611&coll=GUIDE&dl=GUIDE.
Prince, et al., "The Design of an Interactive Online Help Desk in the Alexandria Digital Library", Date: 1999, pp. 217-226, ACM Press, NY, USA, http://delivery.acm.org/10.1145/300000/295693/p217-prince.pdf?.

* cited by examiner

*Primary Examiner*—Don Wong
*Assistant Examiner*—Kim T Nguyen
(74) *Attorney, Agent, or Firm*—Krajec Patent Offices, LLC; Russell S. Krajec

(57) ABSTRACT

A help system tracks user search queries and builds a database by matching the user query to the user's selected result from the search system. As the user repeatedly searches, the user's terminology may be associated with particular search keywords. A relevance factor may be computed using the database for future searches. In some cases, modifications to a user interface may be made by replacing the user's terminology with a function in the user interface, or by highlighting a user's terminology on the user interface using a floating box such as a tool tip.

8 Claims, 5 Drawing Sheets

ADAPTIVE HELP SYSTEM AND USER INTERFACE

BACKGROUND

Many computer tasks or items may be called different names. When a user wishes to perform a task or refer to an item, the terminology on a user interface may not make sense to the user, who has his or her own terminology for the task or item. In many help systems and other databases that are commonly searched, a synonym list may be used to find other search terms or keywords that may be related to a user query. By using synonyms which may include misspellings and derivations of keywords in a search query, more results may be returned for a query.

In presenting search results, some systems calculate a relevance calculation or other factor that can be used to rank the results. The factor can be used to raise certain results and lower others so that the most relevant results are presented so that the highest ranked results are easy for the user to find. In many cases, the highest ranked results may be presented at the top of a list or may be highlighted in some other fashion.

SUMMARY

A help system tracks user search queries and builds a database by matching the user query to the user's selected result from the search system. As the user repeatedly searches, the user's terminology may be associated with particular search keywords. A relevance factor may be computed using the database for future searches. In some cases, modifications to a user interface may be made by replacing the user's terminology with a function in the user interface, or by highlighting a user's terminology on the user interface using a floating box such as a tool tip.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
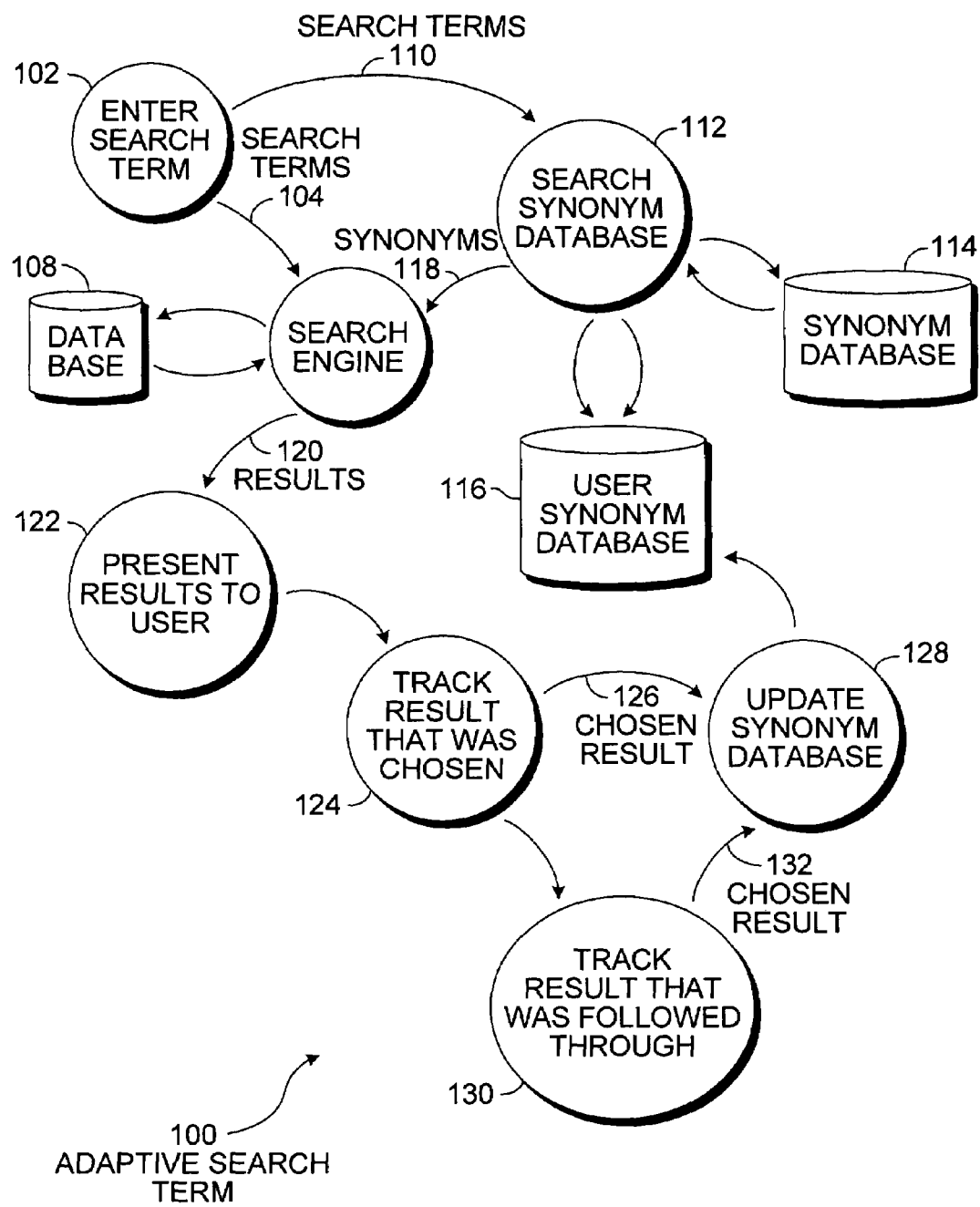
FIG. 1 is a diagram of an embodiment showing the generation of adaptive search terms.

A search system tracks a user's terminology and the results that the user selects to generate a synonym database that is tailored to the user. When a user selects an item from a results list, the keywords associated with the selected result are matched to the terms found in the user's initial search query and a relevance factor is established. If similar searches are performed again, the relevance factor is increased. The association between the user's terms and the keywords may be used in place of a default term on a user interface, help system, or other areas so that a user interface may adapt to the user's preferences.

Additionally, the synonym database developed with the user's terms may be used to bring more relevant results when performing a search query. The user's terminology may be colloquially, culturally, or educationally different than keywords used to categorize or index potential search results. As the user makes several searches, the correlation of the user's terms to indexed keywords may be greater and may raise the relevance of certain search results.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with adaptive search terms. The search term is entered in block 102. Search terms 104 are transferred to the search engine in block 106 to search the database 108. Search terms 110 are also transmitted to block 112 to search synonym databases. A standard synonym database 114 is searched along with a user synonym database 116. The synonyms 118 are sent to the search engine 106 are also queried.

The standard synonym database 114 may be developed by the creators of the database 108 or may be a general synonym database used for general searches. In cases where the search engine 106 and database 108 are small and well defined, such as a help system for a computer application, the synonym database 114 may be written by technical writers who develop the help system. In cases where the search engine 106 is a general purpose search engine and the database 108 is an indexed version of many disparate web pages, the synonym database 114 may be a general compilation of synonyms.

The user synonym database 116 may be developed over time and may contain the user's terminology mapped to other terms that may be commonly used. In some instances, the user synonym database 116 may be present on a local data storage device whereas the synonym database 114 may be also present on the local data storage device or may be located remotely and hosted by a server.

The search results 120 are sent to block 122 where the results are presented to a user. In many cases, the search results may be sorted with a relevance factor so that results with a high relevance may be presented in a way that the user may see them first. The relevance factor may or may not be displayed to the user with the search results 120.

The result that the user selected is tracked in block 124. In many cases, the result that was picked may have one or more keywords associated with the result. The chosen result 126 is sent to block 128 where the user's terminology is correlated to the result's keywords. In some instances, the correlation may include a relevance factor.

When a user selects a result, generally there is a slight correlation between the user's search terms and the result. In some cases, the user may be browsing for an unspecified topic or something in the results list may catch the user's attention and may even be distracting from the original intent of the search. Because of the slight correlation, a relevance factor that correlates the user terminology with the result keyword may be relatively weak, especially initially. If a user performs a similar search with similar terminology and selects results having the same keywords multiple times, the correlation may become much stronger. Thus, if a correlation already exists in the user synonym database 116, an existing relevance factor for the correlation may be raised.

In some applications, the results selected by a user may be able to be tracked to completion. An example may be a help system where the results from a search may have several steps that are followed to complete a specific action. If the user completes the steps in the example, the correlation between the user query and the selected result may have a higher relevance factor than if the user merely selected the result but did not follow through. Results that are tracked until follow through in block 130 are sent as the chosen result 132 to update the synonym database in block 128.

The adaptive search terms 100 may operate in several different environments. In one environment, the search engine 106 and database 108 may be constrained to a relatively fixed number of possible result queries, and each of the result queries may have substantial amount of metadata including keywords. A good example of such a system is a search system that is part of a software application, and may typically be a help system. In such an example, a fixed number of help topics may be indexed and cross referenced using various keywords or other links. The keywords may be hidden from the user but used during a search query.

In some systems, the function of a synonym database 114 may be replaced by including synonym keywords as metadata for each help entry. Many such systems may have keywords and metadata that are well edited, properly formatted, and properly spelled. Also, the keywords used in the help system may correspond to actions or topics available in the computer application.

Another environment may be where the search results have little metadata, such as a general search engine that spans the Internet or a search engine that searches files in a directory structure. Such databases may contain indexing and cross referencing by keywords that are pulled from text of a webpage, name of a file, or other places. The keywords may be extracted by various mechanisms but may be misspelled, improperly formatted, or generally may not be as well formatted as a closed environment such as a help system. Additionally, the adaptive help system may not be able to track whether a user's selection is followed through in many such cases.

Figure 2:
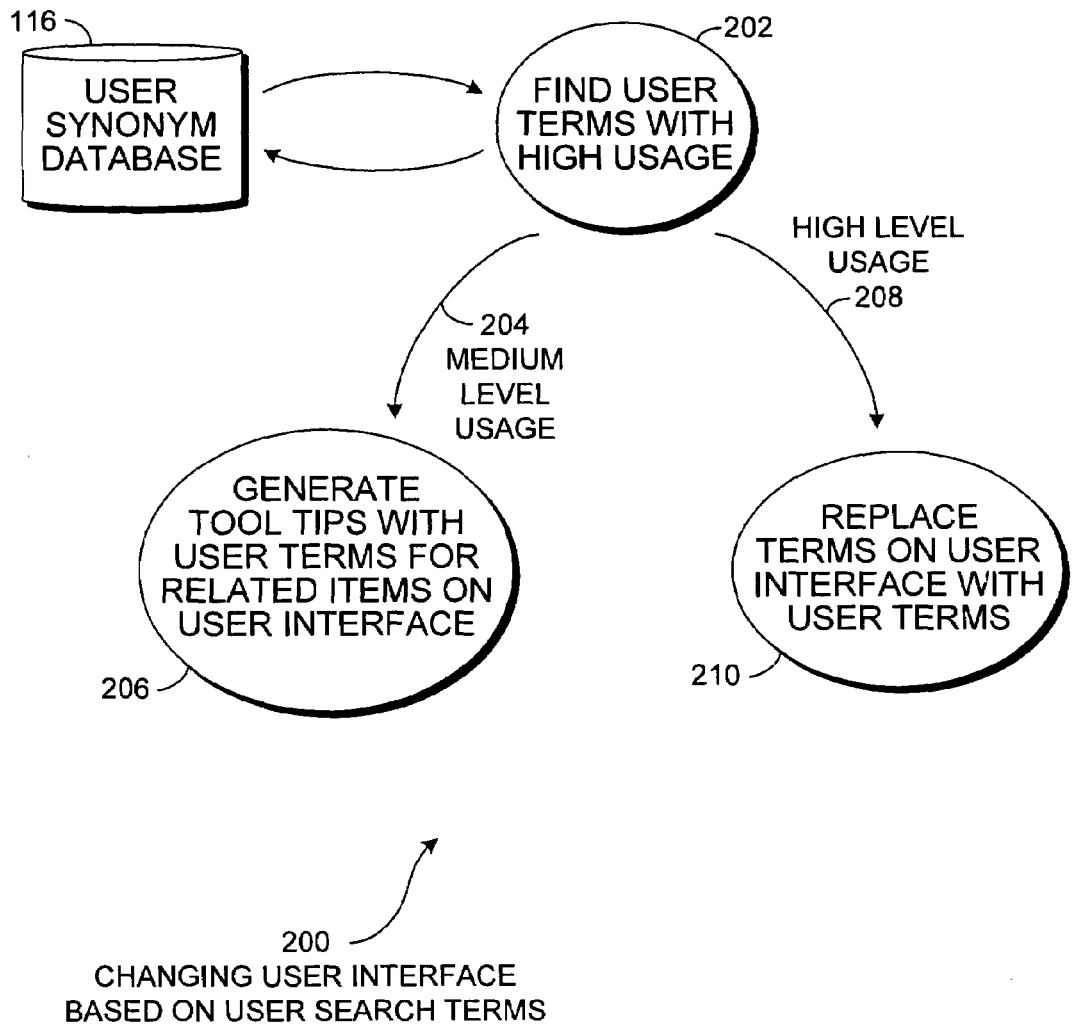
FIG. 2 is a diagram of an embodiment showing a mechanism for changing a user interface using user generated search terms.

FIG. 2 is a diagram of an embodiment 200 showing how a user interface may be changed using adaptive search. From time to time, the user synonym database 116 may be culled in block 202 to find user terms with high usage. When a term is used with moderately high usage 204, tool tips may be generated with the user terms and used to highlight related terms on a user interface in block 206. A term with a high level of usage 208 may replace terms on the user interface directly in block 208.

Embodiment 200 may cause changes to any type of user interface. An example is where the user synonym database 116 is developed in conjunction with a help system for a particular software application. For example, when a user creates a query looking for a particular function within the application, the keywords associated with the selected result often correspond with particular functions available on a user interface.

A tool tip may be any type of help window that may be created to give help to a user based on the position of a cursor or pointer on a user interface. In some implementations, a small text window may appear when a cursor is held over a command for a second or two. The small text window may have a brief description of the command, for example.

Replacing items on a user interface with the user's terms may be performed in situations where there is a very high correlation between the user's terms and keywords that are on a user interface. In a typical scenario, a user may perform a query looking for a specific function and using their own term or phrase, but may not recognize a term or phrase used on the user interface as the one that performs their intended action. After a certain number of similar queries, the user's search terms may be incorporated into the user interface and thereby adapt the user interface to the user.

Figure 3:
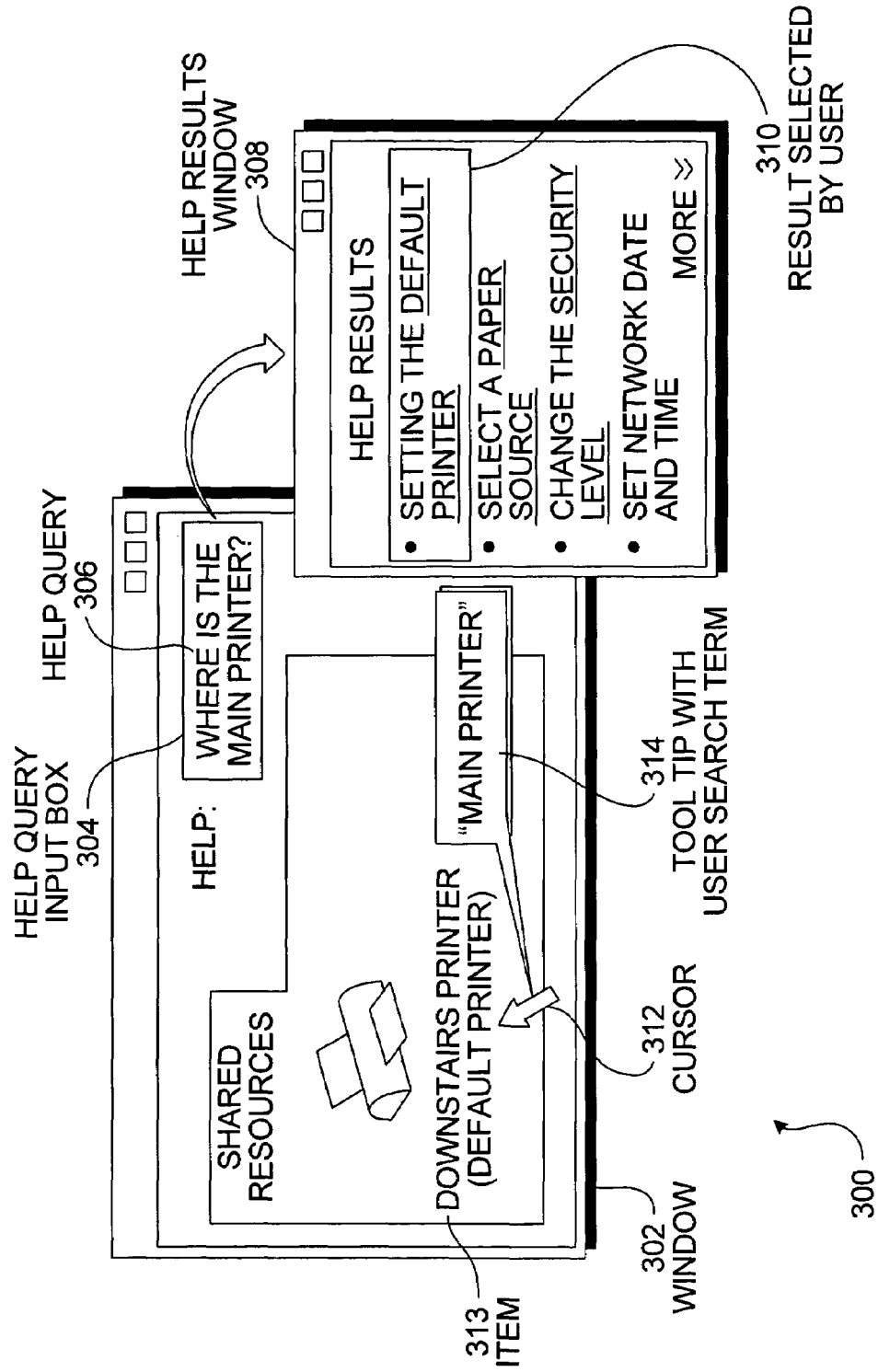
FIG. 3 is a diagrammatic illustration of an embodiment showing a user interface with incorporated search terms.

FIG. 3 is a representation of an embodiment 300 of an example of a user interface. The user interface comprises a main application window 302. The main window 302 contains a help query input box 304 and a user's help query 306 that asks "Where is the main printer?" The results of the help query are presented in a help results window 308.

The result 310 selected by the user is entitled "Setting the Default Printer". From the search query and the result selected by the user, the user term "Main Printer" may be associated with "Default Printer". In order to associate the two terms, an analysis can be run on the user query to find the main words or phrase by knocking out the phrase "Where is the" and recognizing the terms "printer" and "main" as significant. Similarly, the keywords "Default Printer" may be found in the title of the help topic 310 or may be embedded in metadata within the help system.

Item 313 is an icon in the main window 302 showing the default printer. When a cursor 312 is placed over the icon 313, a tool tip 314 is displayed with the user search term. In this case, the tool tip contains "Main Printer" which is the user's term for the "Default Printer".

In another embodiment, the term "Default Printer" in icon 313 may be replaced with the user search term "Main Printer", and example of direct modification of a user interface.

Figure 4:
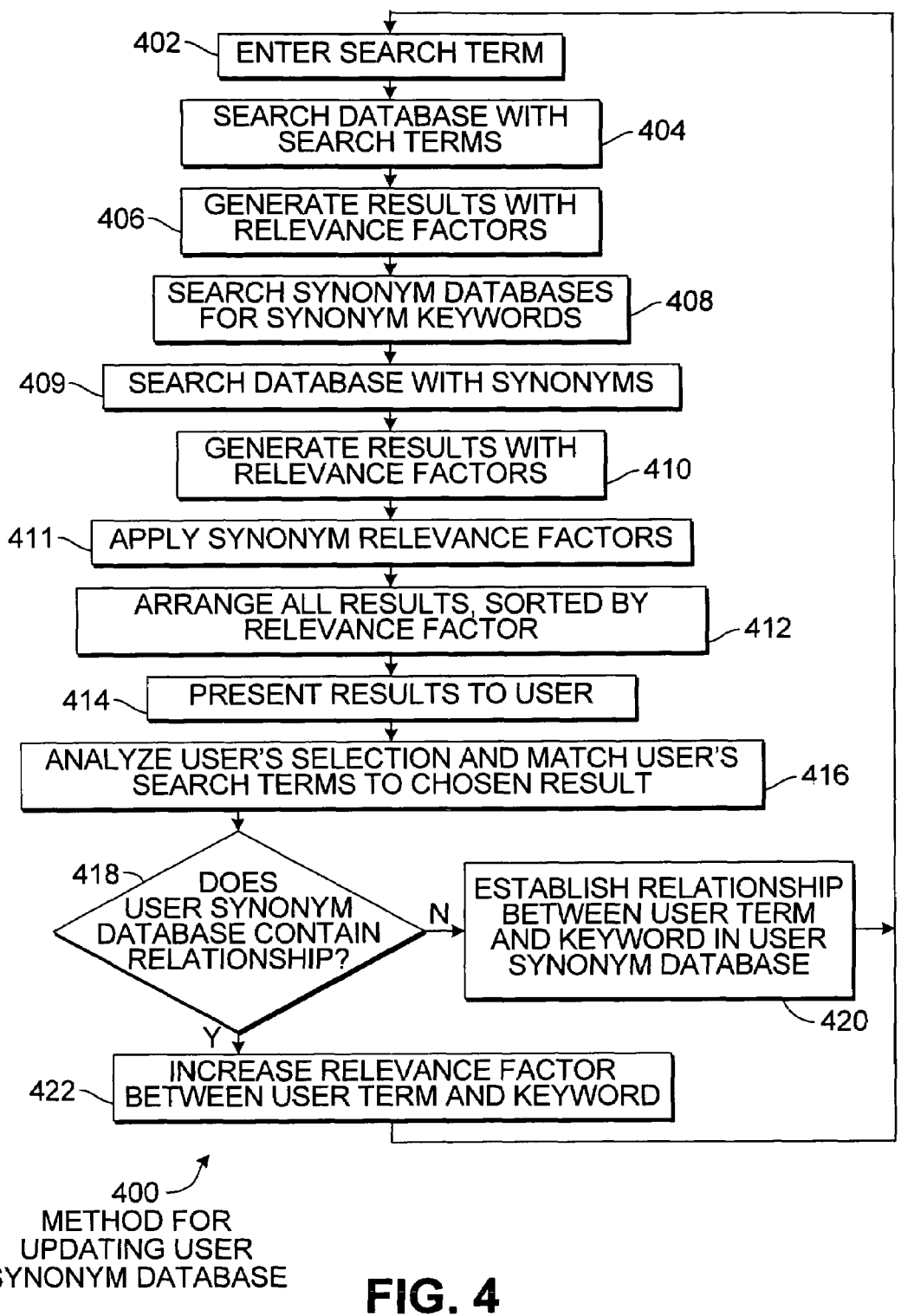
FIG. 4 is a flowchart illustration of an embodiment showing a method for generating a user synonym database.

FIG. 4 is a flowchart illustration of an embodiment 400 showing a method for updating a synonym database. A search term is entered in block 402 and a search is performed of a database using the search terms in block 404. The results are generated with relevance factors in block 406.

Synonym databases are searched in block 408, which would include a user generated synonym database, to generated synonyms for the main terms of the search query. The database is searched using the synonyms in block 409, and results are generated in block 410 with relevance factors. The relevance factors applied to the synonyms are then applied in block 411 to the synonym results of block 410.

The results are arranged and sorted by relevance factor in block 412 and presented to the user in block 414. The user's selection is tracked in block 416 and the keywords associated with the selection are matched to the user's search term.

If the user synonym database does not contain a relationship between the search term and the keyword in block 418, a new relationship is established in block 420 with a default relevance value. If the user synonym database does contain an existing relationship, the relevance value is increased in block 422. The process continues back to block 402.

Figure 5:
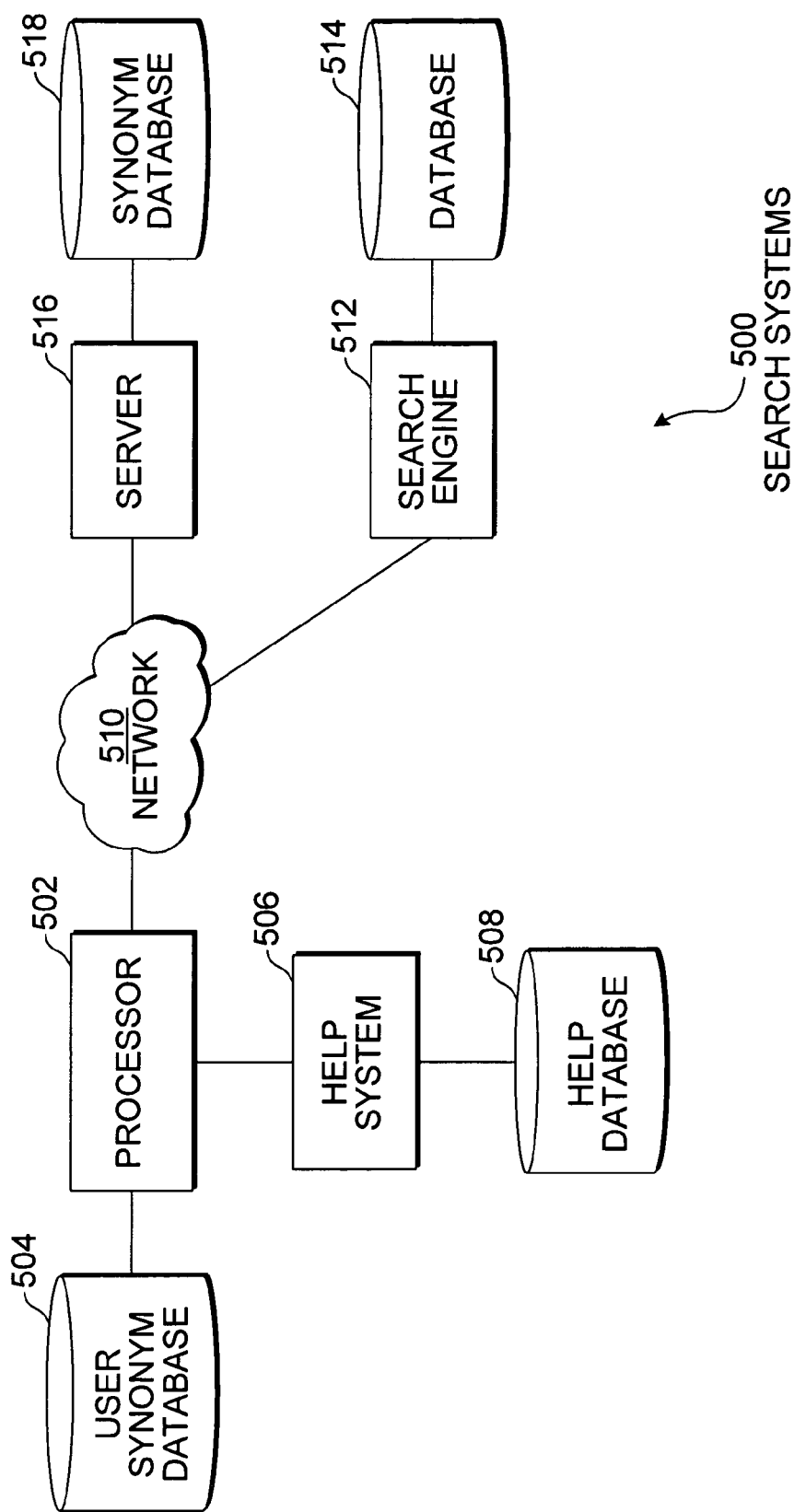
FIG. 5 is a diagram of an embodiment showing several search systems.

FIG. 5 is a diagram of an embodiment 500 showing various search systems. A processor 502 has a user synonym database 504 and a locally attached help system 506 and help database 508. These items may be contained in a standalone device or may be separate devices or software components connected by a network or other connection. In a typical example, the objects 502, 504, 506, and 508 may be contained in a personal computer. Some of the objects 502, 504, 506, and 508 may be hardware components, such as the processor 502, or may be software components, such as the help system 506. The databases 504 and 508 may be stored on a data storage device and may have software components that manage the databases.

The processor 502 may be connected to a network 510 and thereby to a search engine 512 that is adapted to search a database 514. Such a search engine may include large, internet-wide search systems. Other search engines may be directed towards specialty databases that contain scientific papers, phone directories, geospatial databases, financial records, or any other type of data or information. The user synonym database 504 may contain separate user generated synonyms for individual databases and search systems, the separate groups of synonyms being used in conjunction with the respective individual database or search system. In other embodiments, the user synonym database may be an aggregation of all user generated synonyms regardless of origin.

Some embodiments may include a server 516 with a database 518. The server 516 may periodically collect data from the user synonym database 504 for storage in database 518 and further analysis. The server 516 may be adapted to analyze the database 518 to find user terminology that may be included in standardized synonym databases. For example, users of a particular help system may generate several user synonym databases. By aggregating and analyzing the databases, authors of help systems may begin to use different terms to describe the help topics and update keywords to reflect different user's names for various subjects or topics.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   presenting a user interface having at least one user selectable function and a help query input;
   receiving a help query;
   searching a database of help responses, each of said help responses being assigned at least one keyword, said database comprising synonym relationships for at least a portion of said help query;
   generating a group of help responses;
   calculating a relevance factor for each of said help responses in said group to form a list of help responses;
   presenting said list of help responses;
   tracking a selected response from said list; and
   associating said at least a portion of said help query with at least one keyword assigned to said selected response, said associating comprising establishing a synonym relationship between said at least one keyword and said at least one user selectable function; said associating further comprising changing a relevance factor for said synonym relationship;
   adding tool tins to said at least one user selectable function by a method comprising:

determining a keyword associated with said user selectable function;

determining at least a portion of said help query that is associated with said keyword;

determining a first relevance factor for said at least a portion of said help query input and said keyword; and determining that said first relevance factor is above a predetermined limit and displaying said tool tins comprising said at least a portion of said help query.

2. The method of claim 1 wherein said keyword comprises a plurality of words.

3. The method of claim 1 wherein said at least a portion of said help query comprises a phrase.

4. The method of claim 1 wherein said synonym relationships comprise predetermined synonym relationships.

5. A computer readable storage medium comprising computer executable instructions adapted to perform the method of claim 1.

6. A computer readable storage medium comprising computer executable instruction adapted to create a user interface comprising:

a user selectable function;

a help system adapted to:

receive a help query;

search a database of help responses, each of said help responses being assigned at least one keyword, said database comprising synonym relationships for at least a portion of said help query;

generate a group of help responses;

calculate a relevance factor for each of said help response in said group to form a list of help responses;

present said list of help responses;

track a selected response from said list;

associate said at least a portion of said help query with at least one keyword assigned to said selected response, said associate comprising establishing a synonym relationship between said at least one keyword and said at least a portion of said help query, said associating further comprising incrementing a relevance factor for said synonym relationship;

add tool tins to said user selectable function by a method comprising:

determining a keyword associated with said user selectable function;

determining at least a portion of said help query that is associated with said keyword;

determining a first relevance factor for said at least a portion of said help query input and said keyword; and determining that said first relevance factor is above a predetermined limit and displaying said tool tins comprising said at least a portion of said help query.

7. The user interface of claim 6 wherein said database comprises predefined synonym relationships.

8. The user interface of claim 6 wherein said at least a portion of said help query comprises a phrase.

* * * * *